United States Patent [19]
Carpenter et al.

[11] Patent Number: 5,859,973
[45] Date of Patent: Jan. 12, 1999

[54] METHODS, SYSTEM AND COMPUTER PROGRAM PRODUCTS FOR DELAYED MESSAGE GENERATION AND ENCODING IN AN INTERMITTENTLY CONNECTED DATA COMMUNICATION SYSTEM

[75] Inventors: Mark Alan Carpenter, Raleigh; Kathy Lockaby Khalifa, Apex; David Bruce Lection, Raleigh, all of N.C.

[73] Assignee: International Business Machines Corporation, Armonk, N.Y.

[21] Appl. No.: 700,947

[22] Filed: Aug. 21, 1996

[51] Int. Cl.⁶ ............................................... H01J 13/00
[52] U.S. Cl. .................................. 395/200.33; 395/200.59
[58] Field of Search .................... 395/200.33, 200.36, 395/200.46, 200.51, 200.59, 200.34, 200.35; 707/10, 203, 204

[56] References Cited

U.S. PATENT DOCUMENTS

| | | | |
|---|---|---|---|
| 5,047,917 | 9/1991 | Athas et al. | 364/200 |
| 5,136,718 | 8/1992 | Haydt | 395/200.46 |
| 5,235,619 | 8/1993 | Beyers et al. | 375/38 |
| 5,263,157 | 11/1993 | Janis | 395/200.59 |
| 5,287,507 | 2/1994 | Hamilton et al. | 395/200.33 |
| 5,349,678 | 9/1994 | Morris et al. | 395/200.33 |
| 5,442,771 | 8/1995 | Filepp et al. | 395/200.33 |
| 5,491,820 | 2/1996 | Belove et al. | 395/200.33 |
| 5,539,885 | 7/1996 | Ono et al. | 395/200.33 |
| 5,574,849 | 11/1996 | Sonnier et al. | 395/182.1 |
| 5,588,132 | 12/1996 | Cardoza | 395/200.46 |
| 5,602,841 | 2/1997 | Lebizay et al. | 370/60 |
| 5,606,719 | 2/1997 | Nichols et al. | 395/200.33 |
| 5,613,148 | 3/1997 | Bezviner et al. | 395/200.33 |
| 5,706,516 | 1/1998 | Chang et al. | 395/680 |

*Primary Examiner*—Nabil Hindi
*Attorney, Agent, or Firm*—Jeanine S. Ray-Yarletts

[57] ABSTRACT

Methods, data processing systems and program products provide delayed generation and encoding of data transmissions by storing a reference to a message to be transmitted as an entry in a transmission request queue. After establishing a communication connection between a host data processor and the portable data processor, the message corresponding to the entry in the transmission request queue is generated, encoded and then transmitted to the host data processor over the communication connection. If user input is received which requests that information resident in the data processor be modified, the data processor determines if the information associated with the modification request includes information contained in a message associated with an entry in the transmission request queue. If the information associated with the modification request includes information contained in a message associated with an entry in the transmission request queue then a copy of the information associated with the modification request is created. A copy is created to provide a version of the unmodified information for use in generating the message associated with the entry in the transmission request queue and to provide a version of the information for modification by the user.

21 Claims, 5 Drawing Sheets

METHODS, SYSTEM AND COMPUTER PROGRAM PRODUCTS FOR DELAYED MESSAGE GENERATION AND ENCODING IN AN INTERMITTENTLY CONNECTED DATA COMMUNICATION SYSTEM

FIELD OF THE INVENTION

The present invention relates generally to message transmission in data processors. More particularly, the present invention relates to message transmission techniques for data processors which reduce memory usage.

BACKGROUND OF THE INVENTION

Increases in processing capability and decreases in cost of personal computers have led to the proliferation of personal computers in all aspects of society, including schools, homes and businesses. Nowhere has this proliferation of personal computers been more prevalent than in the increased use of portable computers. In recent years, decreasing power requirements and the availability of small, high-performance microprocessors has led to a dramatic increase in the use of portable data processors such as a laptop computers, notebook computers, and personal data assistants such as the Apple Newton®, U.S. Robotic Pilot® or the Sharp Wizard®. Additionally, an ever increasing number of users are developing and utilizing application specific portable data processors which are custom designed to carry out a specific task, such as, for example, electronically tracking inventory, parcels or the like.

Although the use of advanced microprocessors and low-power electronics have significantly enhanced the processing capabilities achievable by today's portable data processors, it is still often desirable that the portable unit be capable of accessing a remotely located host computer or network. Such remote access is typically established via a communications interface at each data processor that transmits or receives information.

Numerous portable data processing scenarios are designed to take advantage of such remote accessing capability, such as laptop computers configured for access to the Internet or a shared filing system, and systems which use multiple portable data processors to collect and transmit information from remote locations to a shared, centralized database. Moreover, tradeoffs between the size of a portable data processor, its processing capability, and its cost may limit the processing capabilities of a portable data processor. In such instances, remote access to a host computer or network may be desirable or even essential as a method of augmenting the processing capabilities of the portable data processor. Thus, for example, many hand-held portable data processors access applications which are resident on a remote host data processor, and thus intermittent access to the remote host is essential for proper use of the hand-held processor.

As discussed above, however, many portable data processors, including most hand-held processors, have only limited power and space available. In particular, portable data processors have limited memory due to physical constraints of portability. Such machines are "memory constrained" in the sense that insufficient memory is often available on the machine to store all the applications, objects, or other information that may be desirable while simultaneously running the desired number of applications. These memory constraints are compounded when such a portable data processor is only intermittently connected to the host computer or network, as the limited memory must also be used to transmit messages to the host computer that are generated while the portable unit is disconnected from the host. In fact, when such a memory constrained portable data processor experiences prolonged periods of usage while disconnected from the network, it is possible that the stored messages for transmission to a host processor may require nearly all the available memory and, therefore, limit the operability of the portable data processor until such time as the network connection is reestablished and the messages are delivered and removed from memory. Such occurrences are particularly problematic in object-oriented systems, as a single object can be comprised of references to the data of numerous other objects, and hence transmission of a single object can require transmission of numerous other objects which must be stored until the network connection is reestablished.

Efforts to overcome the above-described problems that may arise in memory constrained portable data processors generally have focused on improving the hardware capabilities of the portable unit, so as to provide additional memory and thereby alleviate the problem. However, such improvements have not solved the problem as more powerful software applications and expanding requirements for remote processing capability have generally out paced the advances in hardware capabilities. Moreover, less attention has been paid to more efficiently using the memory that is available at the portable unit to provide increased performance in memory constrained environments. Accordingly, there is a need to more efficiently utilize the available memory in portable data processors which only intermittently access a remote host or network.

OBJECTS AND SUMMARY OF THE INVENTION

In view of the above limitations associated with existing memory constrained data processors, it is an object of the present invention to provide data processors which more efficiently use limited memory resources.

A second object of the present invention is to allow more applications and/or information to simultaneously be resident on memory constrained data processors that are in intermittent communication with a host computer or network.

It is still a further object of the present invention to increase the memory available in data processors which store messages for transmission to a second processor.

These and other objects of the present invention are provided by methods, data processors, or program products which delay generating or encoding messages which are to be transmitted to a remote host computer until after a communication link is established between the portable data processor and the host. Such delayed generation and encoding minimizes the memory required to store messages that access or update information resident on the host computer during periods when the portable data processor is disconnected from the network.

Delayed generation and encoding is provided by storing a reference to a message to be transmitted as an entry in a transmission request queue. After establishing a communication connection between a host data processor and the portable data processor, the message corresponding to the entry in the transmission request queue is generated, encoded and then transmitted to the host data processor over the communication connection. The encoded message may also be transmitted to the host data processor as it is generated. By delaying generation and encoding of the message, the memory which would have been utilized to hold a copy of the encoded message is made available for other uses.

In another embodiment of the present invention, if user input is received which requests that information resident in the data processor be modified, the data processor determines if the information associated with the modification request includes information contained in a message associated with an entry in the transmission request queue. If the information associated with the modification request includes information contained in a message associated with an entry in the transmission request queue then a copy of the information associated with the modification request is created. A copy is created to provide a version of the unmodified information for use in generating the message associated with the entry in the transmission request queue and to provide a version of the information for modification by the user. Thus, according to the present invention, a copy of information for transmission is only created if the information is the subject of a modification request.

In further embodiments of the present invention entries are removed from the transmission request queue after they are transmitted. Furthermore, messages may be generated and transmitted while entries remain in the transmission request queue and while the communication connection remains established.

In a further embodiment of the present invention, the data processor determines if a connection method to the host data processor is available and establishes a connection to the host data processor if a connection method is available.

In yet another aspect of the present invention, the message may comprise an object which is to be transmitted to the host data processor and the entry in the transmission request queue is a reference to that object. This object may include one or more embedded objects which are expanded so that the message transmitted includes information from both the object and the one or more embedded objects.

Detailed Description of Preferred Embodiments

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
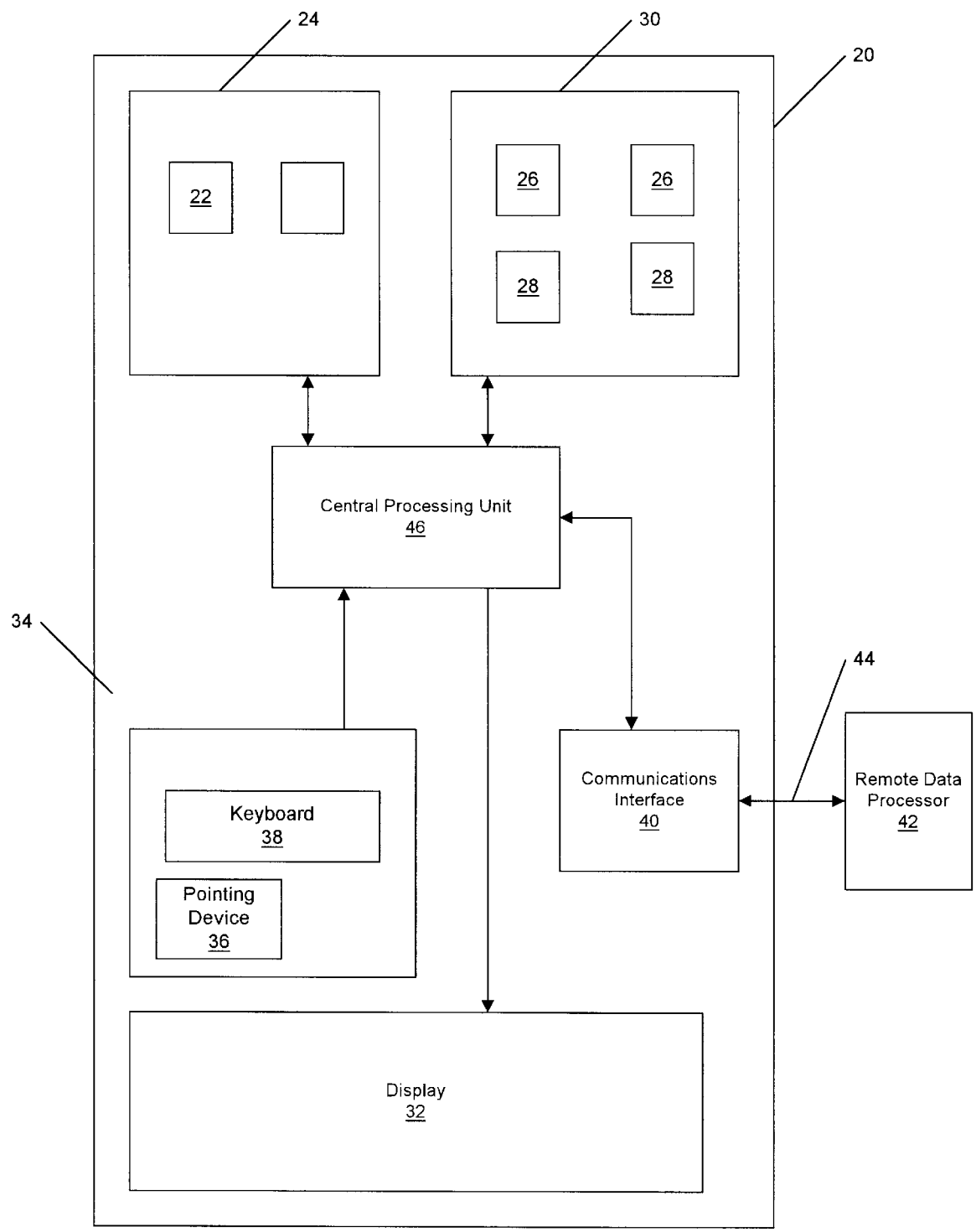
FIG. 1 is a block diagram of a portable data processor.

FIG. 1 illustrates a data processor on which a message queuing and transmission system according to the present invention may be utilized. While FIG. 1 depicts the data processor as a portable data processor, those of skill in the art will appreciate that the principles and techniques of the present invention apply to any type of system which transmits information over a communications link. As seen in FIG. 1, the portable data processor 20 may have an operating system 22 which may be resident in read only memory (ROM) 24 in the processor 20. One or more applications 26 and data 28 associated with such applications may be stored in dynamic memory 30, which may be random access memory (RAM). A central processing unit 46 typically has access to both non-volatile memory 24 and dynamic 30 The processor 20 typically displays information on a display device 32.

The portable data processor 20 may also include means for transmitting messages to, or receiving messages from, a second data processor 42 at a remote location. For example, in FIG. 1, such transmit/receive means is illustrated as a Communications Interface 40 which transmits messages between the portable and host processors over a cable 44. As discussed more fully below, those of skill in the art will recognize that various other methods of passing messages between the portable data processor 20 and the remote data processor 42 may also be utilized.

For obtaining input from a user, the operating system 22, the applications 26 or both may utilize user input devices 34. User input devices 34 may include a pointing device 36, a keyboard 38 or other input devices known to those of skill in the art. Thus, user input might instruct the central processing unit 46 of the portable data processor 20 to execute an application program 26, add, delete or change data 28 associated with an application 26, or obtain information from, or provide information to, a second data processor 42.

Figure 2:
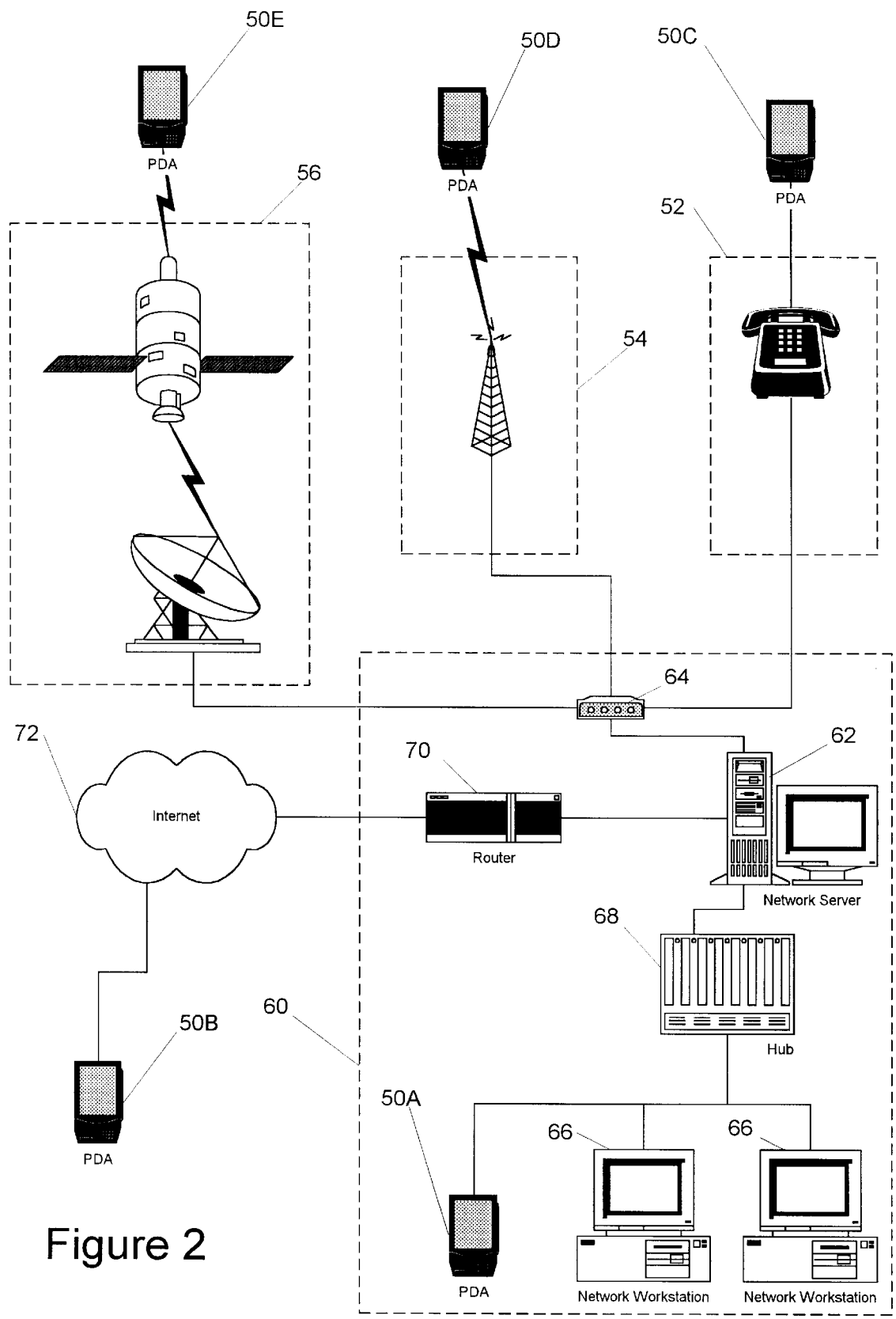
FIG. 2 is a diagram of an apparatus for transmitting a message from a portable data processor to a host data processor.

As described above, the present invention provides methods and apparatus' for transmitting messages from a memory constrained data processor to a host data processor. Several possible connections between a portable data processor and a host data processor are shown in FIG. 2. As will be appreciated by one of skill in the art, these are merely examples of possible connections and are not exhaustive of the possible connection techniques or connection paths which may be utilized in the present invention.

As illustrated in FIG. 2, the present invention may provide a connection between a portable data processor 50A such as a personal data assistant (PDA) and a host data processor 62. The second data processor is illustrated in FIG. 2 as a network server, however, the second data processor may be any form of data processor. In carrying out the operations of the present invention, the portable data processor 50A establishes a connection to the second data processor 62 by whatever method is suitable to the location of the portable data processor. Thus, the portable data processor may select a connection technique suitable to the portable data processor being in a location where a network interface is available. In the present example, the portable data processor 50A would connect to the second data processor 62 utilizing the selected connection technique, such as is illustrated by the connection of portable data processor 50A through hub 68 to the network server 62. In this example, the connection technique would be through a network interface card and the connection path would be the network address of the network server 62. However, as will be appreciated by those of skill in the art other network connections may be suitable for use with the present invention.

As a further example of the a method of establishing a connection according to the present invention, connection from portable data processor 50B to the second data processor 62 could be made through the Internet 72 and router 70. The connection path could then be set to the IP address of the network server 62 which has access to the Internet through router 70, or could be set to the IP address of a local proxy which could be selected based on the location of the portable data processor 50B.

Portable data processors 50C, 50D, and 50E of FIG. 2 further illustrate possible connection techniques from a portable data processor to a second data processor utilizing telephone technology. For example, the portable data processor 50C may be located in a hotel room remote from the network server 62 and, therefore, could dial the network server 72 over traditional telephone lines 52. The connection could then be made to the local area network 60 through modem 64 over telephone lines 52. As illustrated in FIG. 2, portable data processor 50D could connect to local-area-network 60 over a cellular link 54. Finally, with respect to FIG. 2, the portable data processor 50E may be in a location where neither traditional or cellular phone service is available. In such a case, portable data processor 50E could establish a connection through satellite telephone service 56 and connect to local area network 60 through modem 64.

Figure 3:
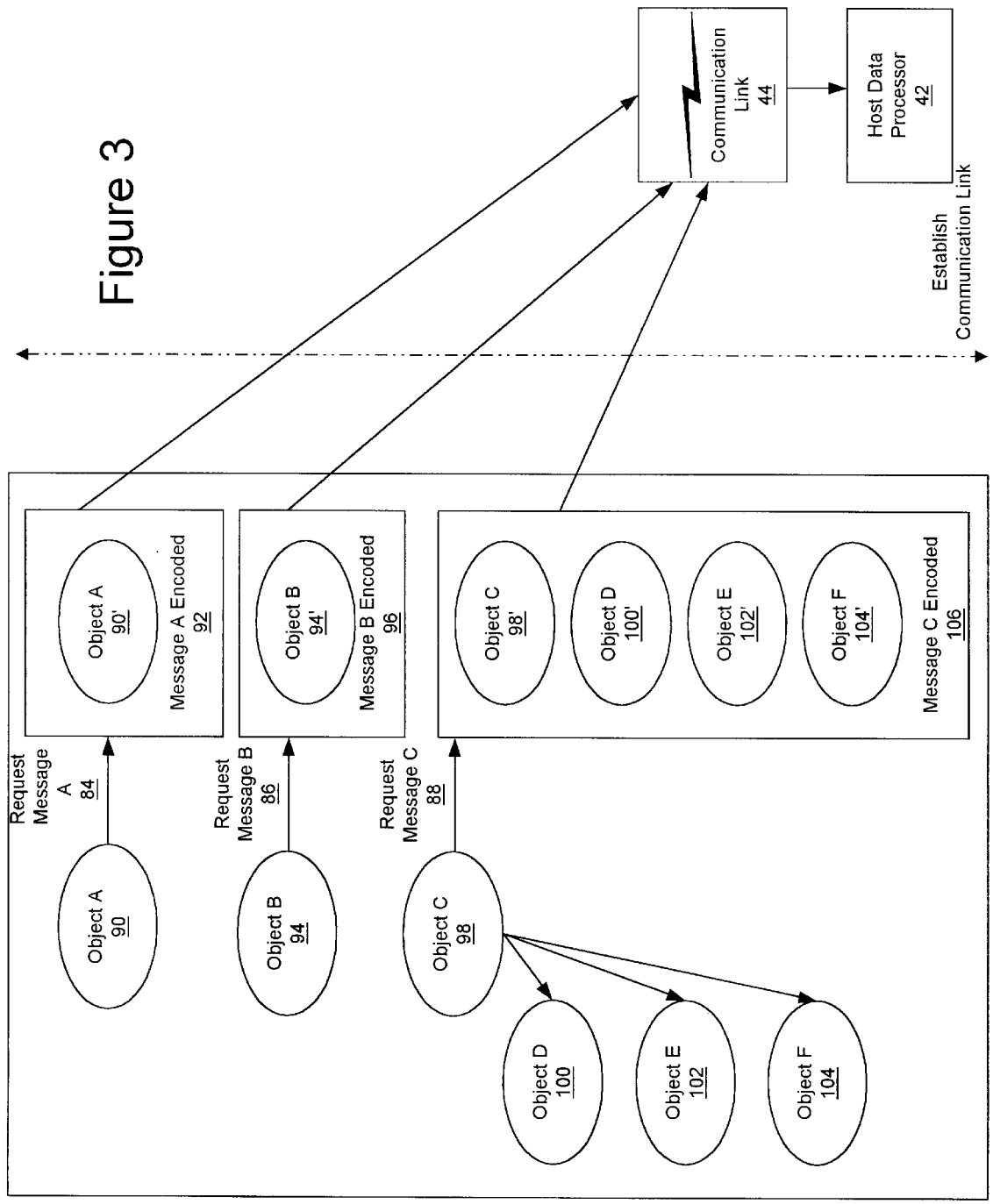
FIG. 3 is an example of possible communications connections between a portable data processor and a host data processor in the system according to the present invention.

As discussed above, many portable data processors which are designed to communicate with a host computer are configured to operate and receive user inputs regardless of whether or not the communications link is established. FIG. 3 illustrates how such portable data processors conventionally operate when disconnected from the host processor. As seen in FIG. 3, various information 90, 94, 98, 100, 102 and 104 is stored in the memory 80 of the portable data processor. While, as will be appreciated by those of skill in the art, such information or data can be in any form, FIG. 3 illustrates this information as comprising various objects labeled Objects A through F.

During operation, the portable data processor receives requests to transmit information to the host data processor. Such requests are illustrated in FIG. 3 as "message requests" 84, 86 and 88 which request transmission of Objects A 90, B 94 and C 98 to the host computer. When a request such as request 84 to transmit information 90 from the portable data processor to the host data processor is received, a copy 90' of the information which is to be transmitted is generated. This copy 90' of the information is then encoded into a network neutral format that attaches additional data to the information 90' which is to be transmitted, and the encoded copy 92 of the information 90' is stored in memory 80. Additional data may also be included with the message to correct or detect errors which may be introduced during the communications process. As such, the encoded copy 92 of the information requires more memory than the information 90' which is to be transmitted, as it contains both the information 90' as well as additional data necessary for transmission of the information over the communications link 44 to the remote data processor 42. Furthermore, the portable data processor also maintains the original version of the message 90.

If the portable data processor is connected to the host data processor 42 via a communications link 44 at the time the encoded copy 92 of a message 90' is generated, the encoded message 92 is transmitted to the host data processor 42 and then may be removed from memory 80. However, if a communications link 44 is not established, then the encoded message 92 must be stored in memory 80 until such time as the portable data processor reestablishes the connection 44 with the host processor 42.

During periods when the portable data processor is disconnected from the host, multiple requests to transmit information to the host may be received. Such requests are illustrated in FIG. 3 as 84, 86 and 88 which request transmission of Objects A 90, B 94 and C 98 to the host data processor 42. In response to these requests, the portable data processor must generate copies 90', 94' and 98' of each object, generated and encode these objects into encoded messages 92, 96 and 106, and store each of the encoded messages in memory 80. During prolonged periods of usage while disconnected from the host data processor 42, most or even all of the memory available on the portable data processor may be occupied by encoded messages awaiting transmission.

When the information to be transmitted to the host data processor is an object, it is possible that the object will reference other "embedded" or "linked" objects which also must be transmitted. This is illustrated in FIG. 3 by Object C 98 which includes Objects D 100, E 102, and F 104. In this situation, it is necessary to generate, encode and store in memory 80 not only a copy of Object D 98, but copies 100', 102' and 104' of each of the Objects D 100, E 102, and F 104.

Figure 4:
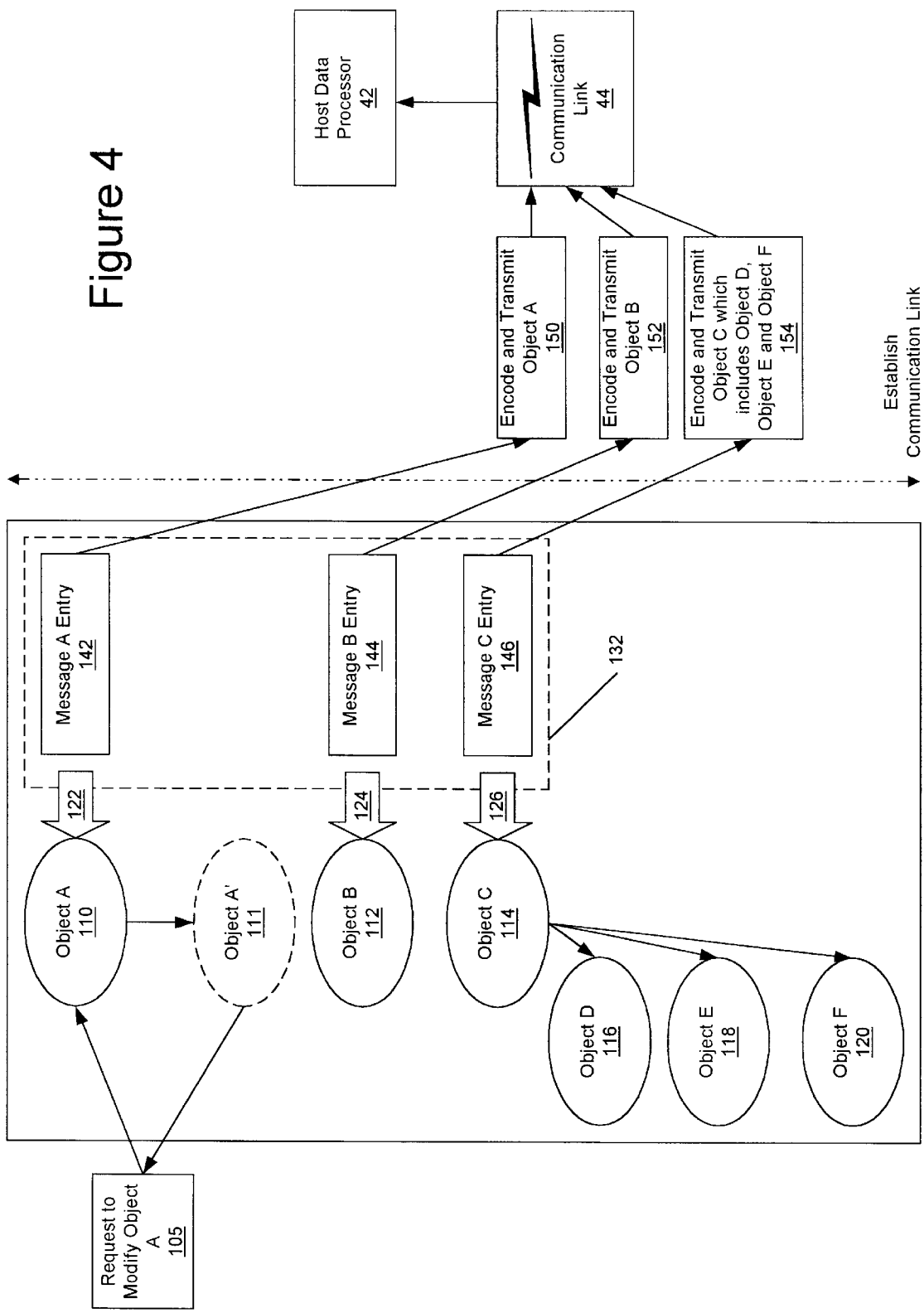
FIG. 4 is a diagram illustrating the transmission of messages from a data processor to a host data processor according to the present invention.

A preferred embodiment of the present invention is illustrated in FIG. 4. As seen in FIG. 4, various information 110, 112, 114, 116, 118 and 120 such as application programs, objects, data files or the like is stored in the memory 130 of a portable data processor. Also resident in memory 130 is a transmission request queue 132 of variable size. As before, when a user input requests that information stored in memory 80 be transmitted from the portable data processor to the host data processor 42, the communications link 44 to the host processor may or may not be connected. If a connection is not established, a reference that identifies the information to be transmitted is generated and stored as an entry in the transmission request queue 132. By way of example, FIG. 4 illustrates three such message requests 122, 124 and 126, which request transmission of Objects A 110, B 112 and C 114 to the host data processor. In response to these requests, entries 142, 144 and 146 corresponding to Objects A 110, B 112 and C 114 are generated and stored in the transmission request queue 132. The entries 142, 144 and 146, however, do not contain the copies of the Objects A 110, B 112 and C 114 but instead merely contain sufficient information to identify these objects when the communications link 44 is reestablished.

When a communications connection 44 to the host data processor is established, the message 150 corresponding to the first reference 142 in the transmission request queue 132 is generated, encoded into a network neutral format and transmitted over the communication link 44. Thus, a second copy of Object A 142 is never stored in memory 130 as the message 150 is generated directly from Object A 110. As such, the only memory required for queuing purposes during periods of disconnection from the remote data processor is the memory required by the transmission request queue to store references to each object or message which is to be transmitted. However, as will be appreciated by those of skill in the art, the present invention does not require that the messages be transmitted directly as they are generated and encoded. To the contrary, one or more encoded objects could be stored in memory during the time a communications link is established but just prior to transmission. However, given the differing speeds between typical communications interfaces and data processors, typically no more than one message need be stored during the transmission process.

If the communications link is already established when a user input requests that information stored in memory 80 be transmitted from the portable data processor to the host data processor, the object can either be directly generated, encoded and transmitted, or a reference to the object can be included as an entry in the transmission request queue. While either method of transmitting messages can be performed with the present invention, the latter approach is more preferred as it ensures that the messages are transmitted in the order that they were requested by the user. However, as will be appreciated by those of skill in the art, entries in the transmission request queue may be prioritized and reordered based upon user input, the types of message to be sent, or any other criteria suitable to a messaging application of the portable data processor.

As further illustrated in FIG. 4, the information to be transmitted can comprise a primary object 114 which contains references to one or more embedded objects 116, 118 and 120. In this situation, it is only necessary to generate and store as an entry in the transmission request queue a reference to the primary object, as the object itself contains references to the embedded objects.

As actual copies of the objects that are to be transmitted to a remote data processor are not created, problems could potentially occur if an application program or user input requests that the contents of such an object be modified while the transmission request queue still contains a reference corresponding to the original (unmodified) version of the object. In particular, if the object is modified before the communications link to the remote data processor is established, then the modified object would be transmitted instead of the original object. To avoid this problem, any requests to modify objects or information are analyzed to determine if the information to be modified corresponds to information contained in a pending message. In the event that a request seeks to modify such information, the portable data processor creates a "shadow" copy of the information prior to modification and preferably updates the entry in the transmission request queue to refer to this shadow copy but may, alternatively, provide the shadow copy to the application requesting the modification. After transmission the original version is removed from memory. In FIG. 4, the creation of a shadow copy is illustrated by the request to modify 105. Because the request to modify 105 is a request to modify Object A 110 which is referenced by entry 142 in the transmission request queue 132, shadow copy 111 of Object A 110 is created. The shadow copy may then be utilized for either modification of the data or for transmission.

Figure 5:
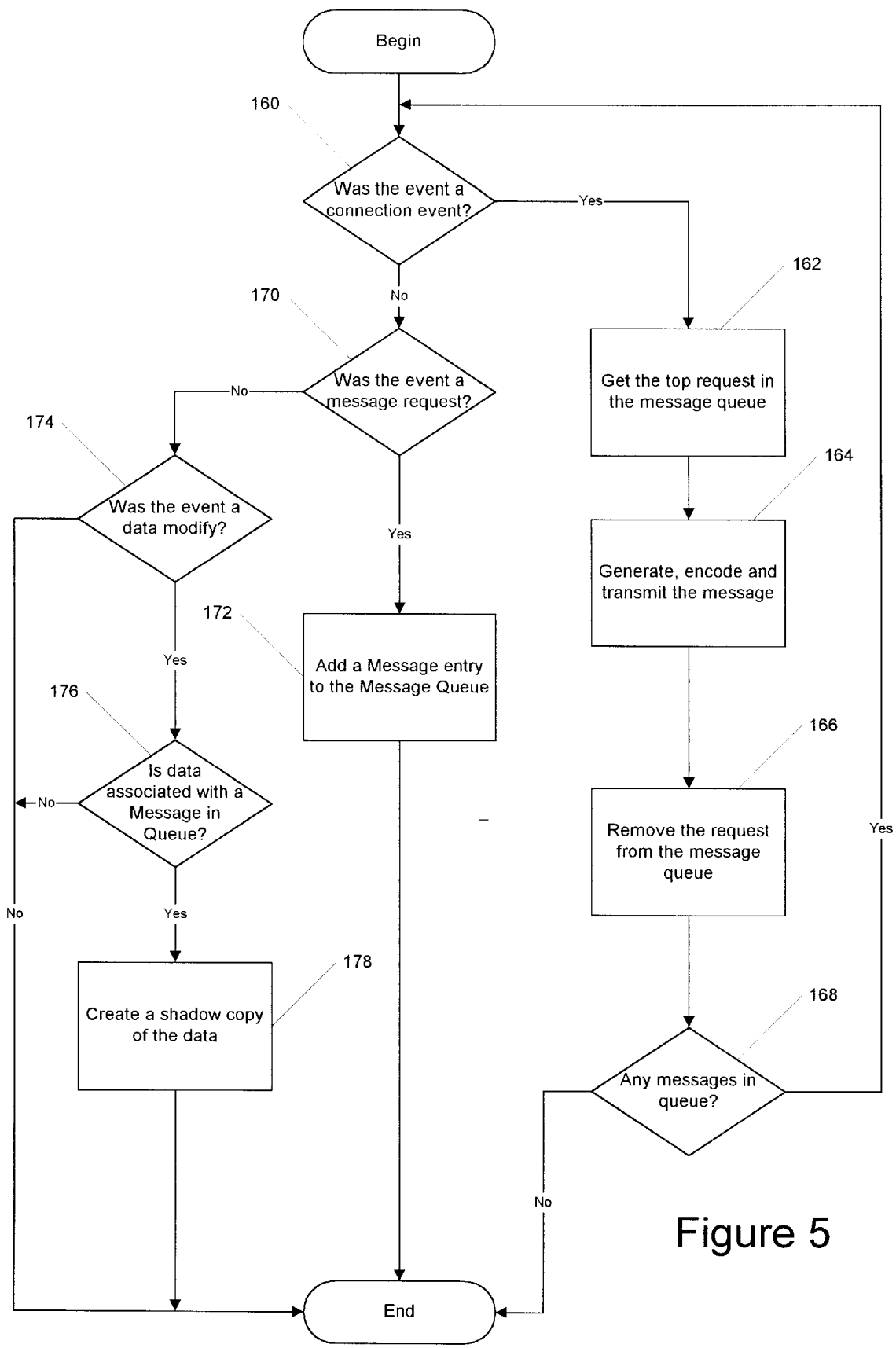
FIG. 5 is a flow chart of one embodiment of the present invention.

FIG. 5 is a flowchart illustration of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As shown at block 160 in FIG. 5, when an event occurs the portable data processor determines if the event was a connection event. As illustrated at blocks 162 and 164, if the event was a connection event, the first entry in the transmit request queue is used to generate, encode and transmit the message which corresponds to this first entry. Thereafter, as shown at block 166, the first entry is deleted from the transmission request queue. The processor then determines whether or not any entries remain in the queue. If there are, the portable data processor continues to generate, encode and transmit the messages referenced by the remaining entries in the transmission request queue, as illustrated by blocks 162, 164 and 166. This continues until all the messages are sent or the connection to the remote data processor is terminated.

As shown at blocks 170 and 172 in FIG. 5, the entries in the transmission request queue are created in response to message requests that are generated by user input or the application programs. Such user input or can also result in requests to modify data, objects or information stored in the memory of the portable data processor, as illustrated in block 174. When such requests to modify data are received, the processor determines if the data to be modified is part of a message referenced by one of the entries in the transmission request queue, as shown at block 176. If the data to be modified is not associated with any pending messages, the processor simply modifies the data as requested. However, if the data to be modified is associated with a pending message, a shadow copy of the unmodified data is generated as shown at block 178.

One example of the present invention involves the use of a PDA with a fixed amount of memory. One particularly useful function of a PDA is as an address book. The entries in an address book may be considered objects with data associated with them which defines, for example, the name, address and phone numbers for an entry. The address book may also be considered an object which makes reference to all of the entry objects to create a complete address book. If a user of the PDA requests that the address book be transmitted to a host processor while the PDA is disconnected from the host processor then under conventional methods a copy of the address book object and all of the objects contained in the address book would be created. As a numerical example, if the encoded object requires approximately 4 times the memory as the object to be transmitted, then for transmission of two objects, one of 50 bytes and one of 100, each message would be 200 bytes and 400 respectively. Since both the original and the messages are stored the total memory utilization prior to transmission would be 650 bytes.

Under the present invention, only a reference to the address book object is created and placed as an entry in the transmission queue. Thus, if an entry in the transmission request queue is 8 bytes in size, then memory usage prior to connection for the same two messages would be 166 bytes as no copies of data are made. If an entry in the address book is modified, under the present invention, copies of only the modified entries are created to provide the appropriate version of the entry for transmission. Therefore, even if one of the two objects for transmission are modified, then only a single copy of the object is made and the total memory usage prior to connection would be 216 or 266 bytes depending upon the object which was modified. Accordingly, the present invention conserves scarce memory resources by reducing the amount of replication required for transmission of messages.

As will be appreciated by those of skill in the art, while the present invention has been described with respect to an object oriented system, the principles and techniques of the present invention apply to any type of system which transmits information over a communication link. Accordingly, the present invention should not be considered as limited to object oriented systems.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of transmitting messages from a memory constrained data processor to a host data processor, the method comprising the steps of:
   storing a reference to a message to be transmitted as an entry in a transmission request queue;
   establishing a communication connection to the host data processor from the data processor; thereafter,
   generating and encoding the message corresponding to at least one of the entries in the transmission request queue based on the stored reference in the transmission request queue after a communication connection is established; and
   transmitting the encoded message generated by said generating step to the host data processor over the communication connection; wherein said generating step and said transmitting step are performed such that the message is encoded and transmitted to the host data processor as it is generated.

2. A method according to claim 1, further comprising the steps of:
   receiving a user input request to modify information resident in the data processor;
   determining if the information associated with the modification request includes information contained in a message associated with an entry in the transmission request queue; and
   creating a copy of the information associated with the modification request if said determining step determines that the information includes information contained in a message associated with an entry in the transmission request queue so as to provide a version of the unmodified information for use by said generating step in generating the message associated with the entry in the transmission request queue and so as to provide a version of the information for modification by the user.

3. A method according to claim 1, wherein said transmitting step is followed by the step of removing from the transmission request queue the entry corresponding to the message generated in said generating step.

4. A method according to claim 3, further comprising the step of repeating said generating, said transmitting and said removing steps while entries remain in the transmission request queue and while the communication connection remains established.

5. A method according to claim 1, wherein said establishing step further comprises the steps of:
   determining if a connection method to the host data processor is available; and
   establishing a connection to the host data processor if said determining step determines that a connection method is available.

6. A method according to claim 1, wherein said message comprises an object to be transmitted to the host data processor and wherein the transmission request queue entry comprises a reference to the object.

7. A method according to claim 6, wherein said object comprises an object including at least one embedded object and wherein said generating step comprises expanding the embedded object to create the message which includes information from both the object and the imbedded object.

8. A method according to claim 1, wherein said storing step comprises storing in a memory device entries of the transmission request queue.

9. A system for transmitting a message from a memory constrained data processor to a host data processor comprising:
   a transmission request queue;
   means for storing a reference to the message to be transmitted as an entry in said transmission request queue;
   means for establishing a communication connection to the host data processor from the data processor;
   means, responsive to said means for storing and said means for establishing, for generating and encoding a message corresponding to said entry in said transmission request queue after said connection is established; and
   means responsive to said generating means for transmitting said encoded message to the host data processor over said communication connection; wherein said encoded message is transmitted to the host data processor as it is generated.

10. A system according to claim 9, further comprising:
    means for receiving a user input request to modify information resident in the data processor;
    means, responsive to said means for receiving, for determining if the information associated with said modification request includes information contained in a message associated with said entry in said transmission request queue; and
    means, responsive to said means for receiving and said means for determining, for creating a copy of the information associated with the modification request if said means for determining determines that the information associated with said modification request includes information contained in a message associated with said entry in said transmission request queue.

11. A system according to claim 9, further comprising means for removing said entry from said transmission request queue.

12. A system according to claim 9, wherein said means for establishing further comprises:

means for determining if a connection method to the host data processor is available; and means for establishing a connection to the host data processor if said means for determining determines that a connection method to the host data processor is available.

13. A system according to claim 9, wherein said message comprises an object to be transmitted to the host data processor and wherein the transmission request queue entry comprises a reference to the object.

14. A system according to claim 13, wherein said object comprises an object including at least one embedded object and wherein said means for generating further comprises means for expanding the embedded object to create the message which includes information from both the object and the imbedded object.

15. A system according to claim 9, wherein said means for storing comprises a memory device.

16. A computer program product for transmitting a message from a memory constrained data processor to a host data processor, the computer program product comprising:

a computer-readable storage medium having computer-readable program code means embodied in said medium, said computer-readable program code means comprising:

computer-readable program code means for storing a reference to the message to be transmitted as an entry in a transmission request queue;

computer-readable program code means for establishing a communication connection to the host data processor from the data processor;

computer-readable program code means, responsive to said computer-readable program code means for storing and said computer-readable program code means for establishing, for generating and encoding a message corresponding to said entry in said transmission request queue after said connection is established; and computer-readable program code means responsive to said generating computer-readable program code means for transmitting said encoded message to the host data processor over said communication connection; wherein said encoded message is transmitted to the host data processor as it is generated.

17. A computer program product according to claim 16, further comprising:

computer-readable program code means for receiving a user input request to modify information resident in the data processor;

computer-readable program code means, responsive to, said computer-readable program code means for receiving, for determining if the information associated with said modification request includes information contained in a message associated with said entry in said transmission request queue; and computer-readable program code means, responsive to said computer-readable program code means for receiving and said computer-readable program code means for determining, for creating a copy of the information associated with the modification request if said computer-readable program code means for determining determines that the information associated with said modification request includes information contained in a message associated with said entry in said transmission request queue.

18. A computer program product according to claim 16, further comprising computer-readable program code means for removing said entry from said transmission request queue.

19. A computer program product according to claim 16, wherein said computer-readable program code means for establishing further comprises:

computer-readable program code means for determining if a connection method to the host data processor is available; and computer-readable program code means for establishing a connection to the host data processor if said computer-readable program code means for determining determines that a connection method to the host data processor is available.

20. A computer program product according to claim 16, wherein said message comprises an object to be transmitted to the host data processor and wherein the transmission request queue entry comprises a reference to the object.

21. A computer program product according to claim 19, wherein said object comprises an object including at least one embedded object and wherein said computer-readable program code means for generating further comprises computer-readable program code means for expanding the embedded object to create the message which includes information from both the object and the imbedded object.

* * * * *